UNITED STATES PATENT OFFICE.

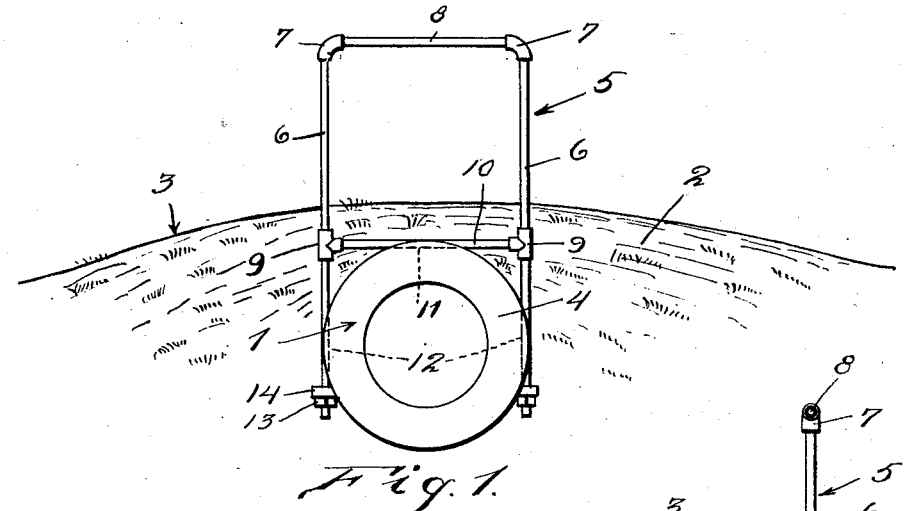
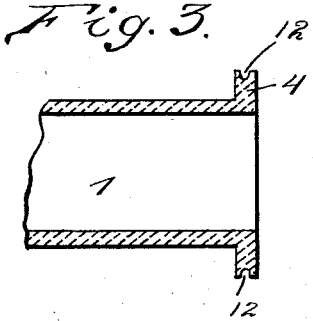
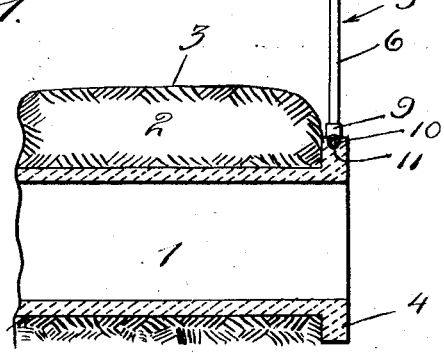
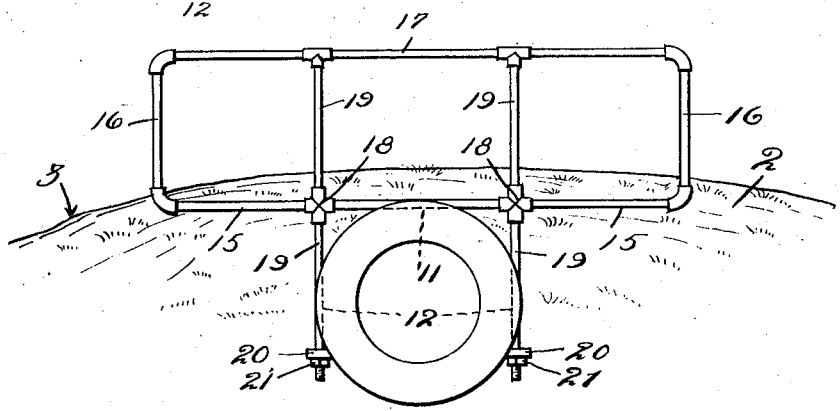

GARDNER A. BELKNAP, OF CONNEAUTVILLE, PENNSYLVANIA.

CULVERT.

1,054,895.  Specification of Letters Patent.  Patented Mar. 4, 1913.

Application filed October 31, 1912. Serial No. 728,955.

*To all whom it may concern:*

Be it known that I, GARDNER A. BELKNAP, a citizen of the United States, residing at Conneautville, in the county of Crawford and State of Pennsylvania, have invented certain new and useful Improvements in Culverts, of which the following is a specification.

This invention relates to a culvert and has particular reference to a guard connected therewith upon its ends.

The object of the invention is to provide a guard or railing upon the culvert for preventing pedestrians or vehicles from crowding off a road passing over the culvert.

Another object is to provide reinforcing means upon the ends of the culvert.

With these and other objects in view, my invention consists in the novel arrangement and construction of parts as hereinafter described, claimed, and illustrated.

In the accompanying drawings: Figure 1 is an end view of my culvert and guard showing a road passing over the culvert, Fig. 2 is a longitudinal sectional view through the same, Fig. 3 is a fragmentary section taken at right angles to the plane of Fig. 2, and Fig. 4 is a view similar to Fig. 1 illustrating a modified form of the device.

Referring more particularly to the drawings, the numeral 1 designates a culvert of any well known or preferred material, preferably concrete, covered with earth 2, which forms the bed for a road 3. Each end of the culvert 1 is provided with a flange or collar 4 upon which is secured my improved guard designated as a whole by the numeral 5. The guard or railing 5 in the form illustrated in Figs. 1 to 3, comprises vertical pipes or rods 6 having upon their upper ends elbows 7 connected by a transverse pipe or rod 8. Also connected with the pipes or rods 6 by means of T-couplings 9, is a horizontal rod or pipe 10 which rests within a groove 11 formed in the collar 4. Similar grooves 12 are formed in the collar 4 at right angles to the groove 11 for the reception of the pipes or rods 6. After the guard 5 is placed in position upon the collar 4 it is held from displacement by means of nuts 13 bearing against beveled washers 14 which abut against the collar 4.

In the form of the device illustrated in Fig. 4, I have shown the guard as being of a length considerably greater than the diameter of the collar on the culvert. In this form a transverse pipe or rod 15 is disposed within the groove 11 and is connected with upright pipes or rods 16 to which is secured a second transverse pipe or rod 17. Upon the pipe or rod 15 are disposed T-couplings 18 to which are connected short vertical pipes or rods 19 which are disposed within the grooves 12 and which are held in position by means of washers and nuts 20 and 21.

It will be observed that this structure forms efficient means for preventing wagons or the like from falling off the road at the culvert.

It will be apparent that the collar 4 has a two-fold purpose and value. It not only serves to hold the guard 5 but also acts as reinforcement for the end of the culvert to strengthen the same, to prevent the earth from crumbling at the end of the culvert, to prevent erosion of the earth at the end of the culvert by the passage of water therethrough, and to present a more finished appearance.

It will be understood that various changes in the construction of the device may be resorted to without departing from the spirit of the invention or limiting the scope of the subjoined claim.

Having thus described my invention what I claim is:

In combination with a culvert provided with a collar upon each of its ends, each of said collars being provided with a horizontal and two vertical grooves, a guard comprising horizontal bars and vertical bars connected therewith, the lower of said horizontal bars being disposed within said horizontal groove and said vertical bars being disposed within said vertical grooves.

In testimony whereof I hereto affix my signature in the presence of two witnesses.

GARDNER A. BELKNAP.

Witnesses.
 A. B. GREENFIELD,
 H. C. GREENFIELD.

Copies of this patent may be obtained for five cents each, by addressing the "Commissioner of Patents, Washington, D. C."